(12) United States Patent
Del Bianco et al.

(10) Patent No.: US 6,859,327 B2
(45) Date of Patent: Feb. 22, 2005

(54) DEVICE FOR DISPLAYING IMAGES THAT ARE RECORDED BY MEANS OF A CAMERA

(75) Inventors: Alessandro Del Bianco, Villach (AT); Christian Paul, Villach (AT); Hermann Oberwalder, Rothenturm (AT); Franz Reininger, Villach (AT)

(73) Assignee: Active Photonics AG Visualisierungs-und Kommunikationsysteme, Villach (AT)

( * ) Notice: Subject to any disclaimer, the term of this patent is extended or adjusted under 35 U.S.C. 154(b) by 0 days.

(21) Appl. No.: 10/149,196

(22) PCT Filed: Dec. 11, 2000

(86) PCT No.: PCT/AT00/00337

§ 371 (c)(1),
(2), (4) Date: Oct. 18, 2002

(87) PCT Pub. No.: WO01/42845

PCT Pub. Date: Jun. 14, 2001

(65) Prior Publication Data

US 2003/0058544 A1 Mar. 27, 2003

(30) Foreign Application Priority Data

Dec. 9, 1999 (EP) .............................................. 99890381

(51) Int. Cl.[7] ........................ G02B 27/14; G02B 17/00; G09G 5/00
(52) U.S. Cl. ........................... 359/630; 359/726; 345/8
(58) Field of Search ................................ 359/630–632, 359/643, 649, 815, 817, 880; 348/158, 162, 164; 345/7–9

(56) References Cited

U.S. PATENT DOCUMENTS

| 3,608,935 A | | 9/1971 | Hodapp |
| H833 H | | 11/1990 | Brindle |
| 5,089,914 A | * | 2/1992 | Prescott ...................... 359/815 |
| 5,949,582 A | * | 9/1999 | Coombs ...................... 359/630 |
| 6,606,114 B1 | * | 8/2003 | Gordon et al. .............. 348/164 |
| 2002/0044361 A1 | * | 4/2002 | Scott et al. .................. 359/630 |

FOREIGN PATENT DOCUMENTS

| DE | WO 01/40844 A1 | * | 6/2001 | .......... G02B/27/01 |
| EP | 0 622 030 | | 11/1994 | |
| EP | 0 899 599 | | 3/1999 | |
| JP | 04-370207 | * | 12/1992 | ............ A42B/3/30 |

* cited by examiner

*Primary Examiner*—Georgia Epps
*Assistant Examiner*—Alicia M. Harrington
(74) *Attorney, Agent, or Firm*—Young & Thompson

(57) ABSTRACT

The aim of the invention is to provide prior art equipment, especially for firemen, in the form of helmets (2) and/or breathing masks (3) with a display unit for infrared images. A mask (6) for displaying images on a display (20) is provided, whereby the images are recorded by a camera (13). The inventive mask comprises a frame (18) having a seal (17) that, when the mask (6) is used, rests on an assigned bearing surface (5), e.g. the visor (5) of a breathing mask (3), in such a way that a sealed chamber (19) is formed between the mask (6) and the bearing surface (5).

20 Claims, 4 Drawing Sheets

DEVICE FOR DISPLAYING IMAGES THAT ARE RECORDED BY MEANS OF A CAMERA

BACKGROUND OF THE INVENTION

The invention relates to a device for screen display of pictures recorded with a camera.

DESCRIPTION OF THE RELATED ART

Firemen must often look for individuals under very difficult conditions, such as darkness or serious vision impairment by smoke, in part with heavy equipment, and must work in advance to the source of the fire; this entails very great dangers. Limited by the heavy respiratory equipment in freedom of movement and vision and due to heavy smoke development or darkness, it is often not possible for the fireman to recognize danger sites and barriers in time. The fireman is therefore reliant solely on his sense of touch.

To solve this problem, in the past several systems were offered which work with infrared cameras by which the fireman is not reliant on visible light for detecting the environment. Especially the infrared radiation from individuals and sources of the fire can be easily recorded with an infrared camera and displayed.

U.S. Pat. No. 5,949,582 discloses a face mask which can be attached to a helmet and into which an infrared camera, a screen for display of the images recorded with the infrared camera, and a respiratory means are integrated. This face mask is feasible as a compact system which leaves the hands of the fireman free. A major defect of this face mask is however that it is not suited for retrofitting onto existing systems consisting of helmets and breathing masks with a display unit. The face mask known from U.S. Pat. No. 5,949,582 is furthermore disadvantageous in that the respirator cannot be used alone, i.e. without the display unit; this makes the procurement costs higher in that in addition to the face mask, also respiratory means without the display unit must be kept available.

SUMMARY OF THE INVENTION

Therefore the object of the invention to further develop a device of the initially described type such that existing equipment in the form of helmets and/or breathing masks can be equipped with a display unit.

This object is achieved by the inventive idea that the simplest and most economical approach for retrofitting existing equipment is to place the screen on which the image recorded by a camera, for example an infrared camera or a CCD camera, can be seen, on a device which is mounted simply on the existing equipment. To prevent limitation or hindrance of the view of the screen due to smoke, soot or other fouling, it is furthermore provided as claimed in the invention that the device is sealed relative to the contact surface so that the penetration of smoke or dirt is reliably prevented. In a host of existing breathing masks or helmets there is a lens or visor anyway which is especially suitable as the sealing surface for the device.

To be able to adapt the device as claimed in the invention to as many existing breathing masks as possible, it can be provided within the framework of the invention that the seal is mounted interchangeably on the frame. In this way it is easily possible to adapt a uniform device to many breathing masks or helmets with different curvatures of the lens, in which a suitably shaped seal is attached to the device in order to provide for reliable sealing.

In one preferred embodiment of the invention it can be provided that the device is connected via a connection to a mounting means for attachment to a helmet and especially that the connection is movable or the connection is spring-elastic.

These embodiments of the invention enable simple attachment of the device to the helmet and furthermore a simple and tight attachment of the device to the visor of the helmet or the lens of the breathing mask. Furthermore, the movable connection also allows the device to be swivelled up out of the field of vision range if this is desired.

Furthermore, the camera can be attached to the mounting means so that a compact system results which if necessary can be attached to the helmet.

Alternatively it can also be provided that the mounting means comprises a shell which is adapted to the helmet and into which the camera is preferably integrated. This embodiment entails the advantage that the camera can be integrated well protected into the shell so that the service life of the camera can be greatly lengthened.

In order to display the images recorded by the camera on the screen, preferably a display unit is used, as is described in European patent application no. 99 890 374.4 of the applicant of this application, the contents of the European patent application no. 99 890 374.4 being expressly declared the contents of this patent application.

In other words, the partially transparent reflector of application number 99 890 374.4 can be used as the screen of this application; the images from at least one projector which has been integrated into the mask as claimed in patent application 99 890 374.4 can be seen on this reflector.

Alternatively, it is however also possible for example for there to be two screens which are each surrounded by one frame with a seal and are located in the field of vision of one eye, and for the frames to be attached to a clip-shaped connection.

BRIEF DESCRIPTION OF THE DRAWINGS

One preferred embodiment of this invention is detailed with reference to the attached drawings.

DESCRIPTION OF THE PREFERRED EMBODIMENTS

Figure 2:
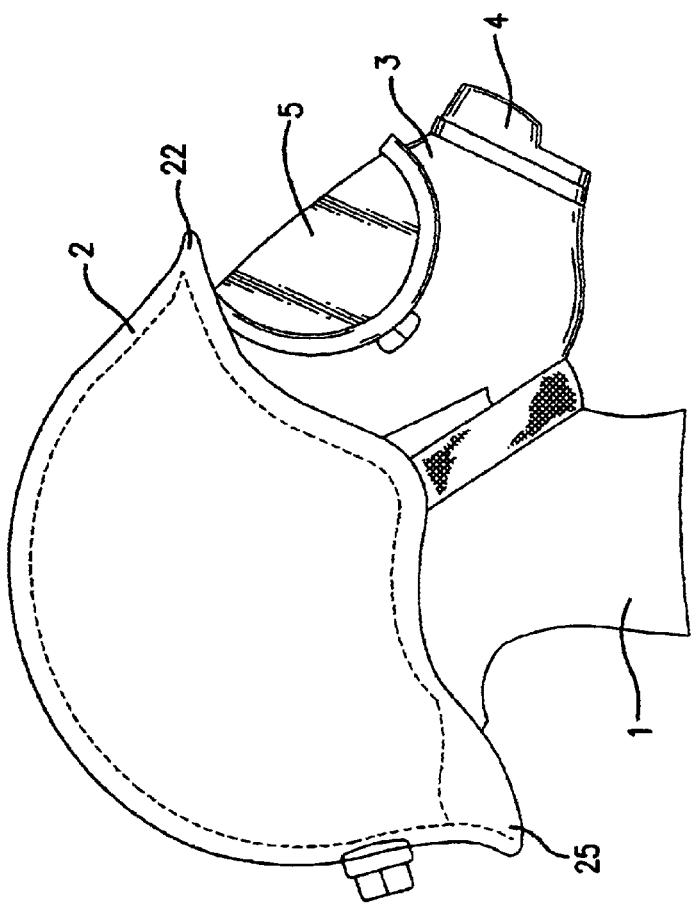
FIGS. 1 and 2 show the standard equipment of a fireman, consisting of a helmet and a breathing mask in a front and side view.
Figure 1:
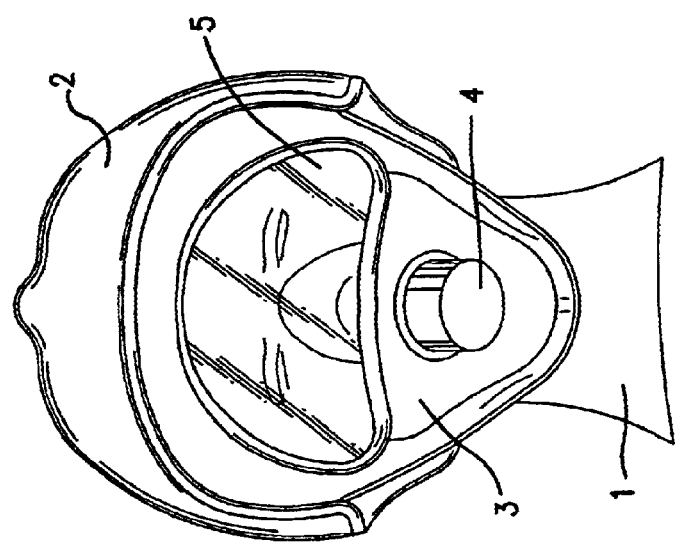

FIGS. 1 and 2 show the head 1 of the fireman who is wearing a helmet 2 with a breathing mask 3. The breathing mask 3 is equipped with a filter 4 and a lens 5.

Figure 4:
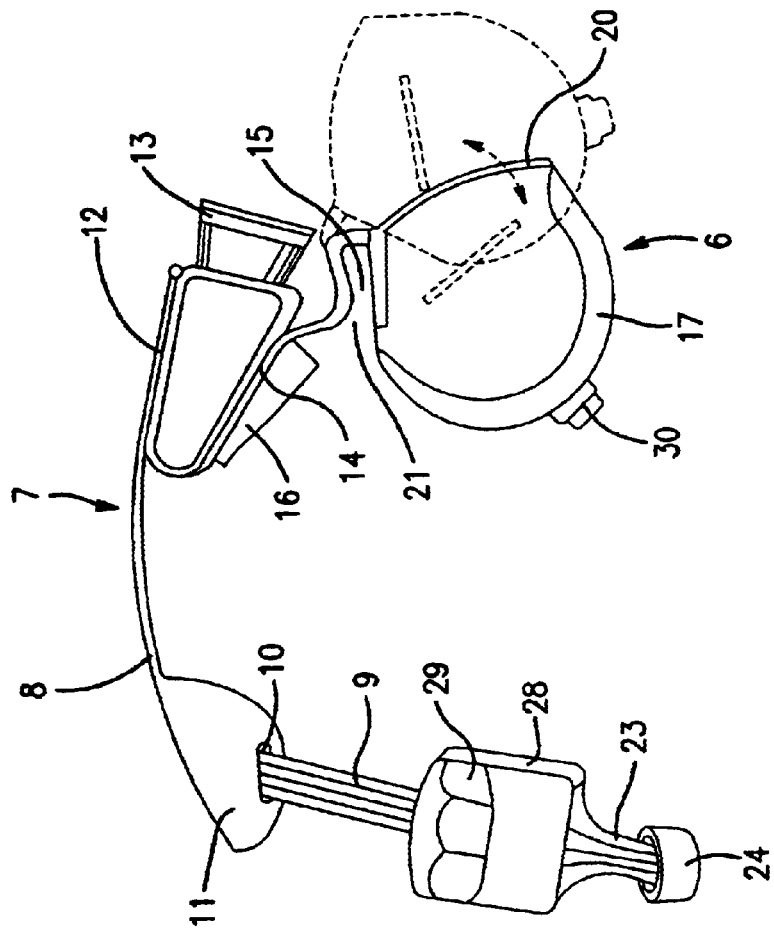
FIGS. 3 and 4 show a device as claimed in the invention in the form of a mask with a mounting means and a camera in a front and side view.
Figure 3:
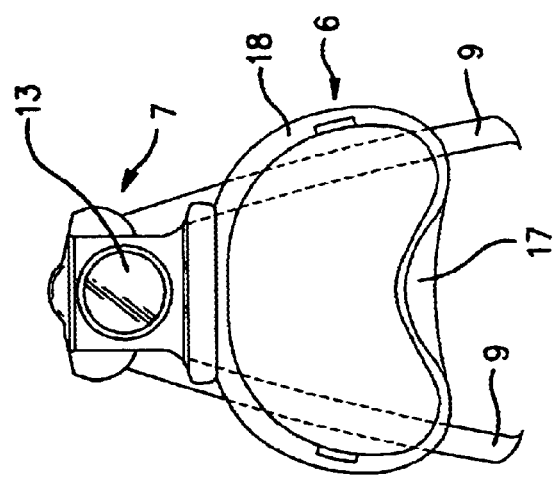

FIGS. 3 and 4 show a device as claimed in the invention in the form of a mask 6 which can be attached via the mounting system 7 to the helmet 2 and in a further sequence to the breathing mask 3.

The mounting means 7 consists essentially of a main belt 8 and a connecting belt 9 which is guided through openings 10 on the back end 11 of the main belt 8. The main belt 8 and the connecting belt 9 are arranged roughly in a x-shape. The main belt 8 cannot stretch, conversely the connecting belt 9 is rubber-elastic in order to clamp the mounting means 7 tightly to the helmet. The front end 12 of the main belt 8 is attached to the top of an infrared camera 13 which for its part is connected via a connecting part 14 and a movable connection 15 to the mask 6.

In order to be able to adjust the tilt of the camera 13 to the horizontal, on the bottom of the connecting part 14 there is an adapter 16 via which the connecting part 14 adjoins the helmet 2. By choosing the wedge angle of the adapter 16, the tilt of the infrared camera 13 to the horizontal can be changed.

In order to enable simple attachment of the mounting device 7 to the helmet 2, on the connecting part 16 there is a hook 21 which can be hooked on the front edge 22 of the helmet 2. Similarly, on the ends 23 of the connecting belt 9 there are attachment clamps 24 which can be hooked on either side on the rear edge 25 of the helmet 2; this takes place such that the connecting belt 9 is tensioned so strongly that the mounting device 7 together with the infrared camera 13 and the mask 6 is attached relatively securely to the helmet 2. Instead of the elastic connecting belt 9 of course there can also be another form of a belt with a variable length, with which the mounting device 7 can be lashed to the helmet 2.

Figure 6:
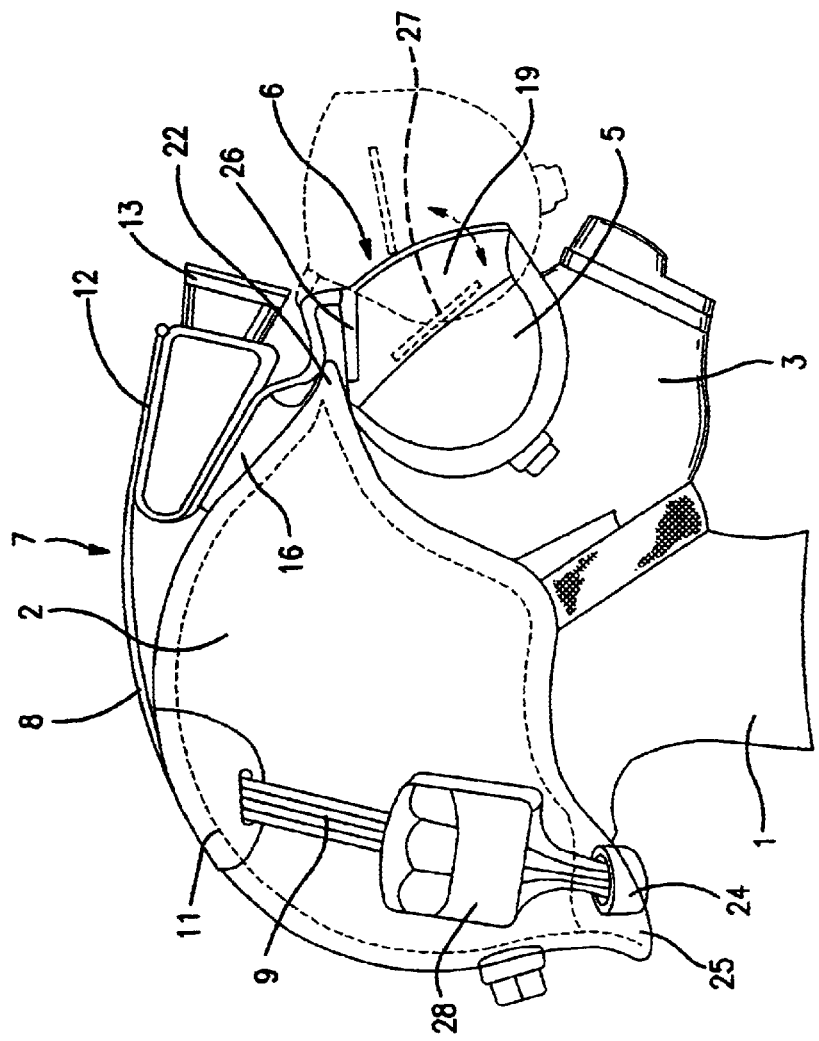
FIGS. 5 and 6 show the arrangement from FIG. 3 in the state mounted on the equipment from FIGS. 1 and 2 in a front and side view and FIGS. 7 and 8 shows a second embodiment of the device as claimed in the invention in the state mounted on the equipment from FIGS. 1 and 2 in a front and side view.
Figure 5:
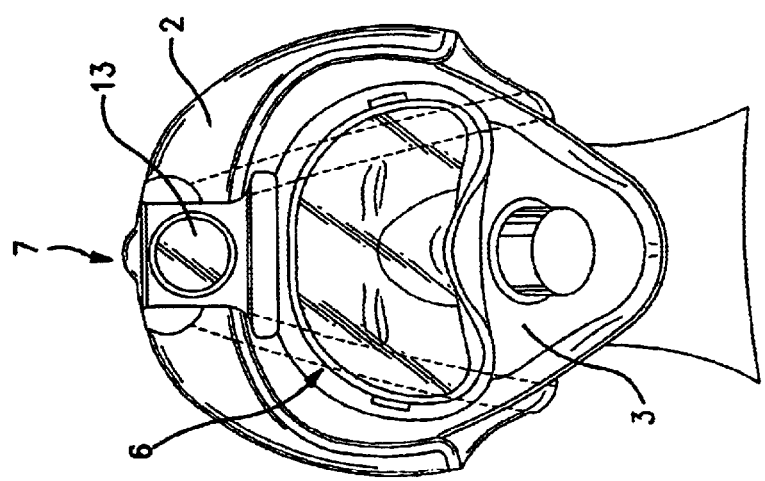

The movable connection 15 makes it possible to swivel the mask 6, as is shown by the broken lines in FIGS. 4 and 6. This entails the major advantages that the mask can be adapted largely independently to the helmet shapes and sizes and the shapes and sizes of the breathing mask and the mask 6 if necessary can be easily swivelled up and thus vision for the fireman 1 can be cleared.

As shown in FIG. 4, the connection can be a flexible connection, but it can also be replaced by other forms of joints. It is preferred if the connection 15 is made such that it presses the mask 6, when the latter is swivelled down, securely against the lens 5 in order to press the seal 17 on the frame 18 of the mask to form a seal against the lens 5 which is used as the contact surface.

In order to reliably seal the space 19 between the lens 20 of the mask 6, the frame 18, the seal 17 and the lens 5 of the breathing mask 3, furthermore on either side of the mask 6 there can be an attachment means 30 in the form of hooks, elastic loops or the like which can be hooked or suspended on the breathing mask 3.

In order to enable simple attachment of the mounting means 7 to the helmet 2, on the connecting part 14 there is a hook 21 which can be hooked onto the front edge 22 of the helmet 2. Similarly, on the ends 23 of the connecting belt 9 there can be attachment clamps 24 which can be hooked on either side on the rear edge 25 of the helmet 2; this takes place such that the connecting belt 9 is tensioned so strongly that the mounting means 7 together with the infrared camera 13 and the mask 6 is attached relatively securely to the helmet 2. Instead of the elastic connecting belt 9 there can of course naturally also be another form of a belt with a variable length, with which the mounting means 7 can be lashed to the helmet 2.

As already mentioned, it is preferred if the display unit is integrated into the mask 6, as is described in patent application no. 99 890 374.4. Since the disclosure of this latter application was accepted by reference into the disclosure of this application, it is simply briefly explained that in the embodiment shown in FIGS. 4 and 6, there are two projectors 26 in the area of the upper edge of the mask 6, that the lens 20 forms the reflection surface and that in the beam path between the projector 26, the reflection surface 20 and the eyes of the fireman there is a semitransparent mirror 27.

It is pointed out that in this invention it is preferred if the display unit is integrated into the mask as is described in application no. 99 890 374.4, but that also any other type of display of images recorded via a camera, as are known from the prior art, can be used.

As is shown in FIGS. 4 and 6, on one side of the connecting belt 9 there is a housing 28 for batteries 29 for the infrared camera 13 and the projector 26.

Figure 8:
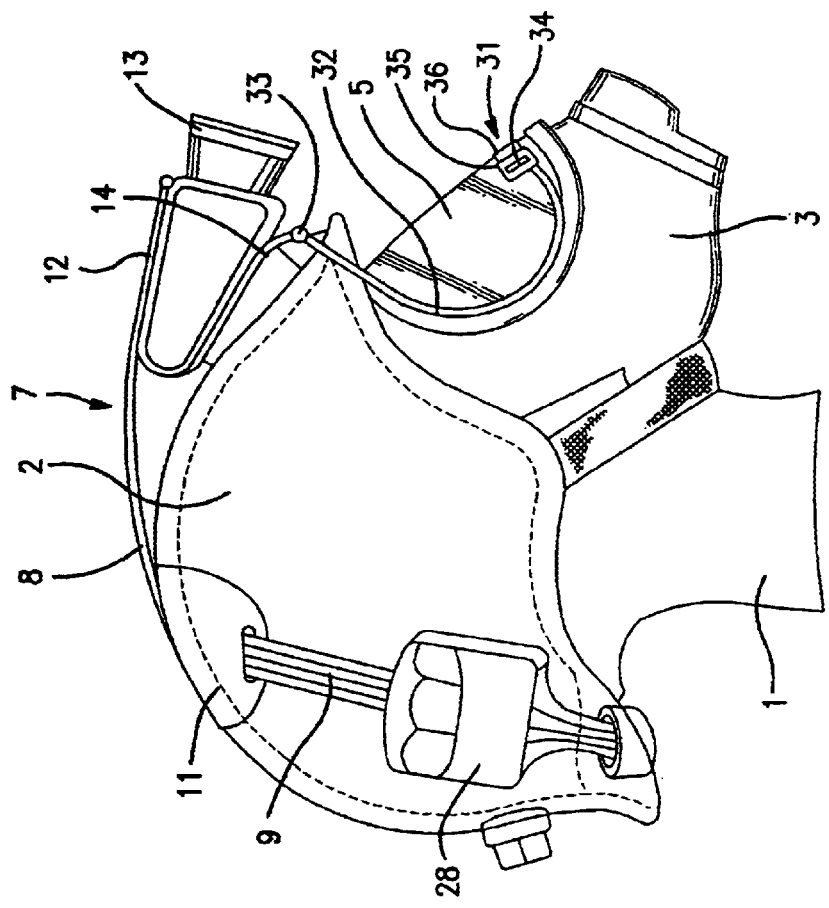
Figure 7:
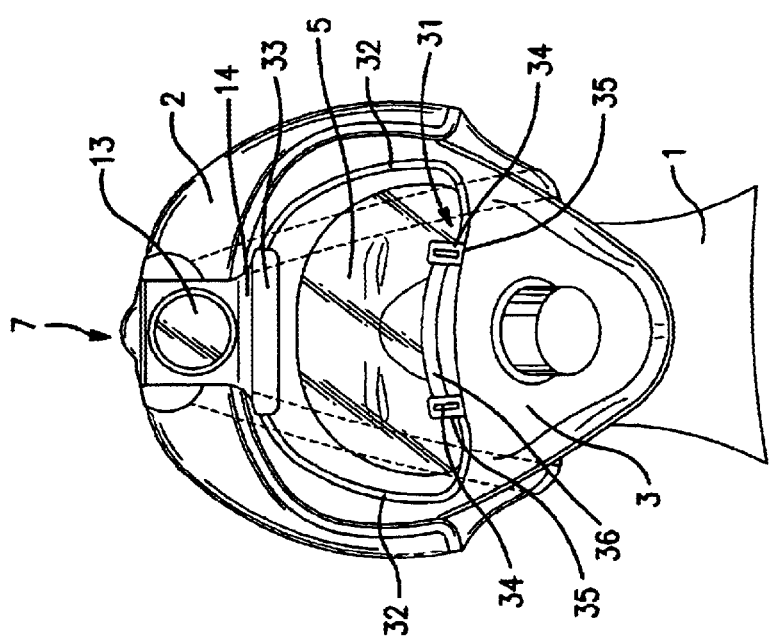

FIGS. 7 and 8 describe another embodiment of the device as claimed in the invention which is labelled 31. The device 31 is in turn attached to the mounting means 7 which has a structure as described with reference to FIGS. 3 to 6.

The device 31 consists essentially of two lateral clips 32 which are connected via a joint 33 to the connecting part 14. On the end opposite the joint 33 on each clip 32 there is a screen 34, for example, a LCD screen. One screen 34 at a time is assigned to one eye of the individual 1, and if necessary an optical system for better or enlarged display of the image can be connected upstream of the screen 34. The screens 34 are in turn held in the frame 35 which forms a seal as it adjoins the lens 5 of the breathing mask 3 via a seal which is not shown. The frame 35 or the ends of the clips 32 are finally connected to one another via a clip or a flexible or elastic belt 36.

The drawings do not show the sending and receiving system for data which are transferred via radio, for example in order to have the fireman receive information in this way, such as floor plans or other special barriers. Furthermore, it is also possible to transmit to the command center with the transmitter the images recorded by the infrared camera and other data, such as pressures or temperatures or the like, which data can of course also be displayed to the fireman 1 via the display unit in the mask 6.

Finally, it is also noted that the mask as claimed in the invention is especially well suited not only for the use among firemen, but also for many other purposes, such as for example in motorcycle helmets, in safety engineering, in border protection, in diving and the like.

What is claimed is:

1. Device for display of images recorded with a camera, on a screen, characterized by a frame which surrounds the screen and on which there is a seal which when the device is being used adjoins an assigned contact surface so that a closed space is formed between the device and the contact surface, wherein the contact surface is the lens of a breathing mask or a helmet.

2. Device as claimed in claim 1, wherein the screen is connected via a connection to a mounting means for attachment to a helmet.

3. Device as claimed in claim 2, wherein the connection is movable.

4. Device as claimed in claim 3, wherein the connection is spring-elastic.

5. Device as claimed in claim 2, wherein the mounting means is tightly clampable to the helmet via at least one elastic means or means of variable length.

6. Device as claimed in claim 2, wherein the mounting means is made essentially Y-shaped and is suspendable via hooks on the edge of the helmet.

7. Device as claimed in claim 2, wherein the mounting means comprises a shell which is matched to the helmet and into which the camera is preferably integrated.

8. Device as claimed in claim 2, wherein the camera is attached to the mounting means.

9. Device as claimed in claim 2, wherein there are two screens which each are surrounded by a frame with a seal and are located in the field of vision of the eye and wherein the frames are attached to a clip-shaped connection.

10. Device as claimed in claim 1, wherein the screen is attachable to the breathing mask via attachment means.

11. Device as claimed in claim 1, wherein the screen is partially transparent.

12. Device as claimed in claim 1, further comprising a mask, within the frame of which there is at least one screen.

13. Device for display of images recorded with a camera, on a screen, characterized by a frame which surrounds the screen and on which there is a seal which when the device is being used adjoins an assigned contact surface so that a closed space is formed between the device and the contact surface, wherein the seal is attached interchangeably to the frame.

14. Device as claimed in claim 13, further comprising a mask, within the frame of which there is at least one screen.

15. Device as claimed in claim 13, wherein there are two screens which each are surrounded by a frame with a seal and are located in the field of vision of the eye and wherein the frames are attached to a clip-shaped connection.

16. A display mask, comprising:

a display device comprising a display screen, a frame mounting and surrounding the display screen, a seal attached to the frame, the seal affixed to sealingly contact an exterior surface of a lens of a mask or helmet so that a sealed, closed space forms between the lens and the frame; and a mounting system connected to the display device for mounting the display device so that the frame is positionable against the exterior surface of the faceplate.

17. The mask of claim 16, further comprising:

an infrared camera operatively connected to the display screen, the camera located vertically above the frame; and and adjustable connecting link located intermediate the frame and the camera, the connecting part being adjustable to adjust a tilt of the camera.

18. The mask of claim 16, further comprising:

a set of hooks attached to the frame to secure the frame to the lens of the faceplate.

19. The mask of claim 16, wherein the mounting system allows mounting and demounting of the display device with the frame positioned against the lens while a user is wearing a breathing mask or a helmet.

20. The mask of claim 16, wherein the mounting system permits mounting of the mask onto a helmet or a breathing mask being worn be a user and permits removal of the mask without removing the helmet from the user.

* * * * *